(12) United States Patent
Süss et al.

(10) Patent No.: US 8,172,439 B2
(45) Date of Patent: May 8, 2012

(54) DISPLAY DEVICE FOR A MOTOR VEHICLE, COMPRISING A SUBSTANTIALLY PARALLEL LIGHT BEAM

(75) Inventors: Manfred Süss, Remchingen (DE); Gerhard Kammerer, Königsbach (DE); Manfred Schwarz, Weil der Sadt (DE)

(73) Assignee: Johnson Controls Automotive Electronics GmbH, Remchingen (DE)

( * ) Notice: Subject to any disclaimer, the term of this patent is extended or adjusted under 35 U.S.C. 154(b) by 162 days.

(21) Appl. No.: 12/373,492

(22) PCT Filed: Jul. 12, 2007

(86) PCT No.: PCT/EP2007/006209
§ 371 (c)(1), (2), (4) Date: May 6, 2009

(87) PCT Pub. No.: WO2008/006593
PCT Pub. Date: Jan. 17, 2008

(65) Prior Publication Data
US 2009/0303738 A1    Dec. 10, 2009

(30) Foreign Application Priority Data
Jul. 14, 2006   (DE) .................. 10 2006 033 040

(51) Int. Cl.
*B60Q 1/26* (2006.01)
(52) U.S. Cl. ............................. 362/488; 362/489; 362/23
(58) Field of Classification Search .................. 362/488, 362/28, 23, 27, 489; 116/288
See application file for complete search history.

(56) References Cited

U.S. PATENT DOCUMENTS

| | | | | |
|---|---|---|---|---|
| 4,163,428 A | * | 8/1979 | Ishikawa | 116/288 |
| 5,510,776 A | * | 4/1996 | Murphy et al. | 340/517 |
| 6,827,034 B1 | | 12/2004 | Paulo | |
| 7,126,564 B2 | | 10/2006 | Schach | |
| 2005/0268839 A1 | * | 12/2005 | Araki et al. | 116/288 |
| 2007/0127228 A1 | * | 6/2007 | Zafferri | 362/30 |

FOREIGN PATENT DOCUMENTS

| | | |
|---|---|---|
| DE | 41 29 975 A1 | 3/1993 |
| DE | 19601270 A1 | 7/1997 |
| DE | 199 04 597 A1 | 10/1999 |
| DE | 100 21 009 A1 | 11/2001 |
| DE | 100 21 099 A1 | 11/2001 |
| DE | 10160259 A1 | 6/2003 |
| DE | 103 43 484 A1 | 4/2005 |
| EP | 1291242 A2 | 3/2003 |
| EP | 1541972 A1 | 6/2005 |
| EP | 1610099 A2 | 12/2005 |

OTHER PUBLICATIONS

International Search from PCT/EP2007/006209. German Office Action dated Jan. 8, 2007 as received in corresponding German Application No. DE 10 2006 033 040.4-51, 4 pages.
Printout of machine translation from www.microsofttranslator.com of pages numbered 1, 2, and 3 of German Office Action dated Jan. 8, 2007 as received in corresponding German Application No. DE 10 2006 033 040.4-51.

* cited by examiner

*Primary Examiner* — Evan Dzierzynski
(74) *Attorney, Agent, or Firm* — Foley & Lardner LLP

(57) ABSTRACT

Disclosed is a display device for a motor vehicle, particularly for a combined instrument of a motor vehicle. The display device comprises a display area and an illumination means that is provided with a light emission area and a light source. The display area has a visible face and a rear face. The illumination means is disposed on the rear face of the display area. A light beam that is emitted from the light emission area is incident directly on the rear face of the display area. The light beam has an angle of spread of less than about 20°.

13 Claims, 3 Drawing Sheets

DISPLAY DEVICE FOR A MOTOR VEHICLE, COMPRISING A SUBSTANTIALLY PARALLEL LIGHT BEAM

The present invention relates to a display device for a motor vehicle, in particular for a combined instrument of a motor vehicle, comprising a display surface and an illumination means having a light exit surface, the illumination means further having a light source, the display surface having a visible side and a rear side, and the illumination means being arranged on the rear side of the display surface.

Such a display device is generally known. For example, American U.S. Pat. No. 6,827,034 B1 discloses a display device for a motor vehicle, a dial plate being illuminated from behind. However, there is the disadvantage here either that the illumination of the dial plate is provided directly behind the dial plate, or that no adequate delimitation of the illuminated area from the unilluminated area is visible on the dial plate, and so the display is visually unattractive.

The object of the present invention is to provide a display device that permits a visually attractive display to be produced on the display device, and yet enables there to be a comparatively large spacing of the illumination means from the display surface so that there is a relatively high design flexibility. This object is achieved by a display device for a motor vehicle, in particular for a combined instrument of a motor vehicle, comprising a display surface and an illumination means having a light exit surface, the illumination means further having a light source, the display surface having a visible side and a rear side, the illumination means being arranged on the rear side of the display surface, and a light beam emanating from the light exit surface falling directly onto the rear side of the display surface, and the light beam having an aperture angle of less than approximately 20°.

It is possible thereby to arrange the light exit surface at a comparatively large spacing from the rear side of the display surface and yet to obtain a comparatively well focused light beam that provides a visually very attractive impression on the front side of the display surface.

According to the invention, it is particularly preferred that the aperture angle is provided to be less than approximately 15°, preferably less than approximately 10°, with particular preference less than approximately 5°, and very particularly preferred for the light beam emanating from the light exit surface to be convergent or substantially parallel or to run convergently or in a substantially parallel fashion. An aperture angle of approximately 0° would be required for a substantially parallel light beam, and an aperture angle with negative values would need to be adopted for a convergent light beam.

It is possible thereby firstly for the visual impression of the light bundle that is visible on the display surface or from the front side of the display surface to be fashioned in a comparatively variable way, and yet to obtain a sharp delimitation between the illuminated area of the display surface and the unilluminated of the display surface such that the display is attractive.

According to the invention, it is particularly preferred that the cross section of the light beam transverse to the propagation direction of the light is square and/or triangular and/or rectangular and/or star-shaped and/or oval. It is possible thereby to coordinate a visual impression on the front side of the display surface with the respective requirements, and to keep it variable.

Furthermore, it is preferred according to the invention that the light exit surface is arranged at a spacing from the rear side of the display surface, the spacing being between approximately 1 millimeter and approximately 10 millimeters, preferably between approximately 2 millimeters and approximately 8 millimeters, with particular preference between approximately 3 millimeters and approximately 6 millimeters. This results in great flexibility with regard to utilization of the installation space, this being valid, in particular, for the area below the display surface, which is particularly critical with regard to the utilization of the installation space.

In accordance with the present invention, it is, furthermore, advantageous when the illumination means has a lens, the lens having the light exit surface, and the light source being arranged on the side of the lens averted from the light exit surface. It is thereby possible according to the invention to achieve good focusing of the light beam even with a very low outlay on light guiding measures.

It is, furthermore, also preferred according to the invention that the illumination means has a lens system with the lens and a further lens, the further lens being arranged between the lens and the light source. It is possible thereby to achieve a particularly good and optimized beam guidance by means of the use of two lenses.

Furthermore, it is also preferred according to the invention when the light source comprises at least one light-emitting diode, or when the light exit surface is provided below the display surface in a fashion rotatable about a rotation axis substantially perpendicular to the display surface, or the illumination means is arranged on a subsurface pointer. Consequently, on the one hand it is possible according to the invention to set up the display device to be particularly flexible to different display requirements, and on the other hand it is possible according to the invention to use components such as light-emitting diodes that function simply and reliably, and thereby to fashion the display device to be particularly cost effective.

Exemplary embodiments of the present invention are illustrated in the drawing and explained in more detail in the following description.

Figure 1:
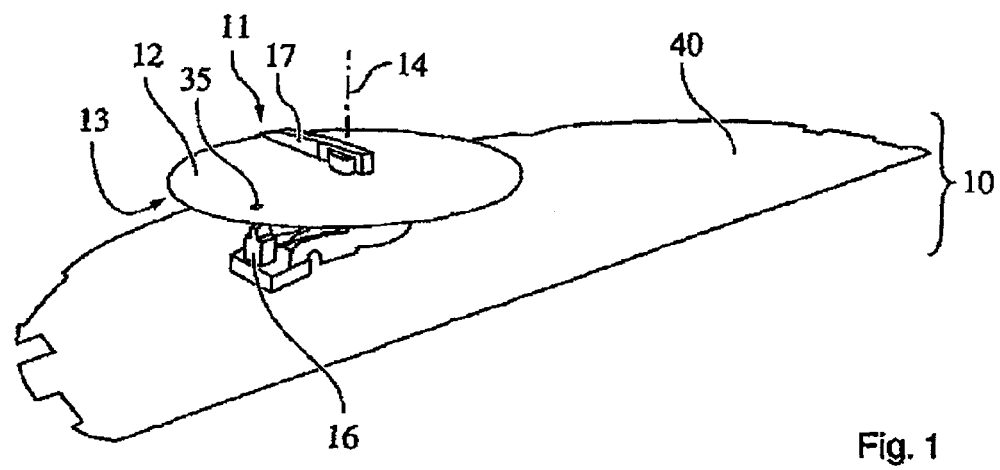
FIG. 1 shows a perspective view of the display device with a display surface.

FIG. 1 shows a perspective illustration of an inventive display device 10 with a display surface 12. The display surface 12 has a visible side 11 or a front side 11. Furthermore, the display device 12 has a rear side 13 that is marked in FIG. 1 by means of an arrow. A rotatable pointer 17 is depicted on the front side 11 or the visible side 11 of the display surface 12 as an example of the display of a value on the display surface 12. In accordance with the present invention, it is, however, not necessary for a pointer 17 to be present on the front side of the display surface 12. The pointer 17 is provided in a fashion rotatable about a rotation axis 14 running substantially perpendicular to the display surface 12. Furthermore, the reference numeral 40 denotes a printed circuit board that is assigned to the display device 10. According to a preferred design of the present invention, there is located on the rear side 13 of the display surface 12 a subsurface pointer 16 on which an illumination means 20 is fastened in a rotary arrangement for optically displaying an information item on the front side of the display surface 12. The subsurface pointer 16 is likewise rotatable here about either the rotation axis 14, or else about an axis parallel to the rotation axis 14.

Figure 2:
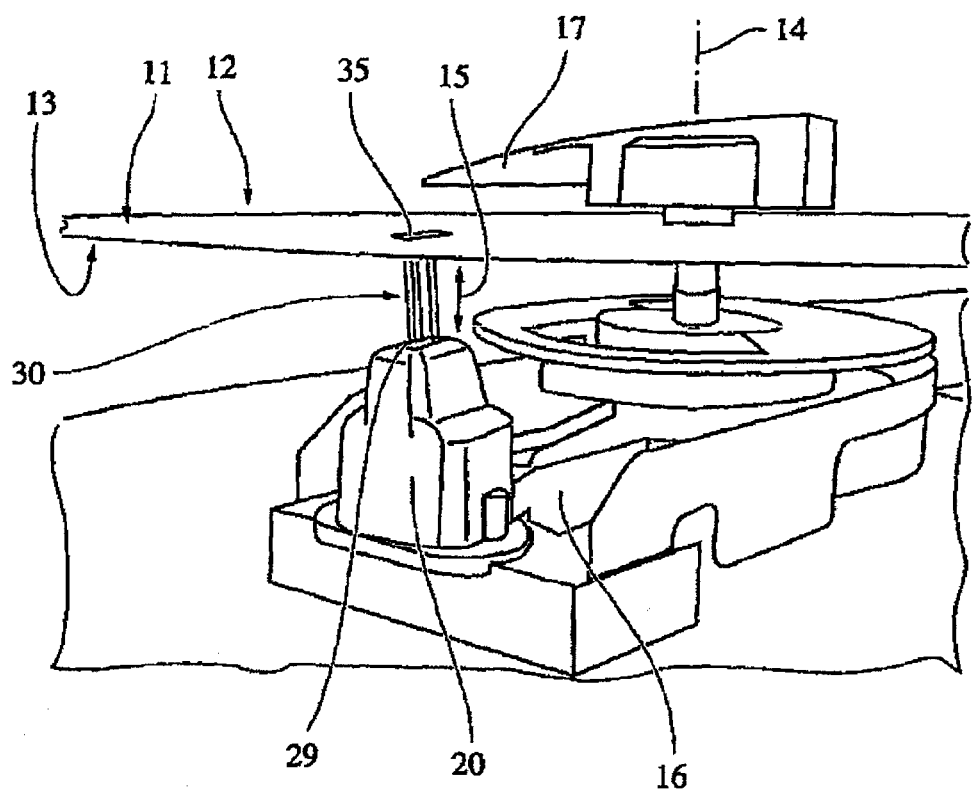
FIG. 2 shows a more detailed illustration substantially in a direction parallel to the display surface of the display device.

FIG. 2 shows an illustration of a detail of the inventive display device 10 in accordance with a perspective representation. The display device 10 has the display surface 12 with its front side 11 or visible side 11 and its rear side 13. In accordance with the present invention, the illumination means 20 with a light exit surface 29 is arranged on the rear side of the display surface 12, the illumination means 20 emitting a light beam 30 that falls onto the display surface 12 from its rear side 13. The display surface 12 is provided at least partially in a transparent fashion. Consequently, for a user of the display surface 12 the light beam 30 is visible on its front side 11 as an item of optical information. The light beam 30 emerges from the light exit surface 29 of the illumination means 20 and falls onto the rear side 13 of the display surface 12, there being provided between the light exit surface 29 and the display surface 12 or its rear side a spacing 15 that is, in particular, between approximately 1 millimeter and approximately 10 millimeters, preferably between approximately 2 millimeters and approximately 8 millimeters, with particular preference between approximately 3 millimeters and approximately 6 millimeters. According to the embodiment illustrated in FIG. 2, as well, the illumination means 20 is arranged on the subsurface pointer 16, and can therefore rotate with the latter about the rotation axis 14. However, in accordance with the present invention this is not mandatory, because it would also be possible for the illumination means to be fixed and arranged beneath the display surface 12.

Figure 3:
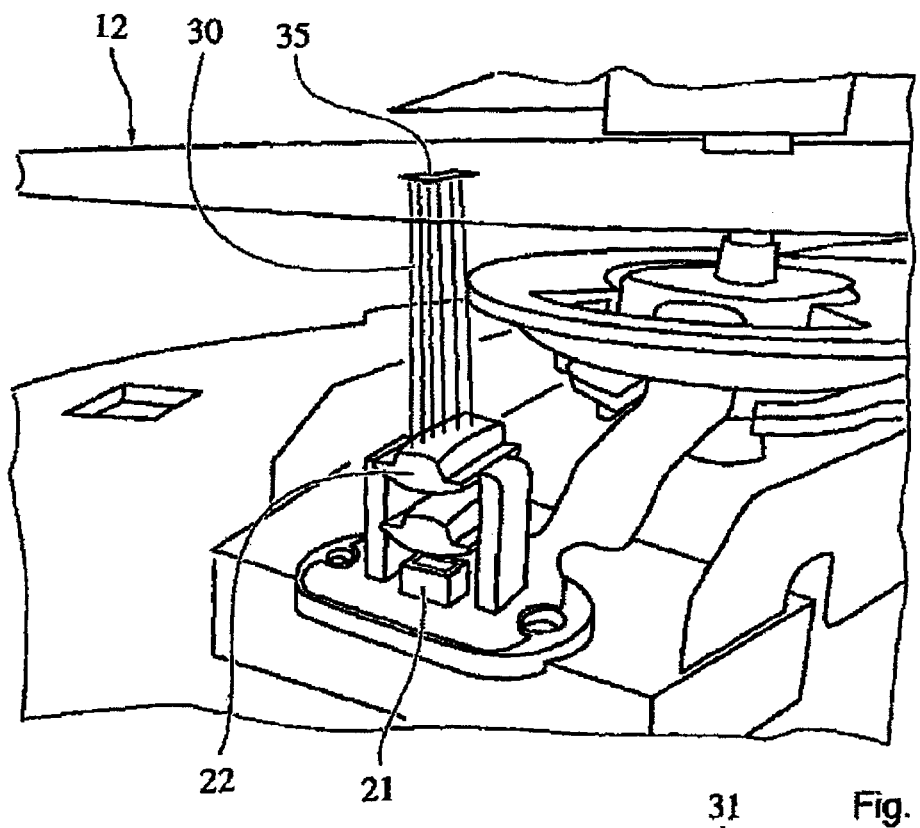
FIGS. 3 and 4 show illustrations of the display device that correspond to FIG. 2 but are enlarged in illustration.
Figure 4:
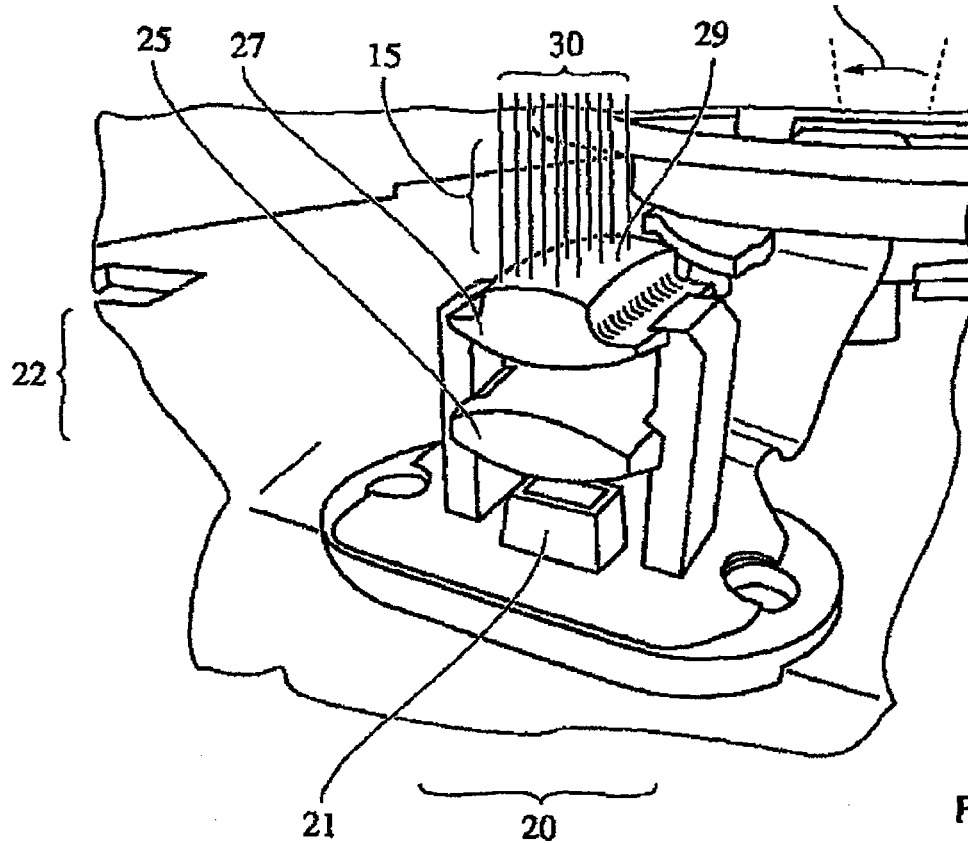

A further enlarged illustration of the display device 10 is represented in a perspective illustration in FIG. 3. To be seen in this illustration is the illumination spot 35 that is produced on the front side of the display surface 12 by the light beam 30 and is provided according to the invention with a particularly sharp surround and therefore has a particularly advantageous visual charm. Furthermore, in FIG. 3 the illumination means 20 is illustrated in a form at least partially cut away. Thus, it can be seen that the illumination means 20 has a light source 21 that is, in particular, designed as a light-emitting diode, or is designed as a plurality of light-emitting diodes. It is provided, in particular, in the case of the illumination means 20 that the latter has a lens system 22 above the light-emitting diodes or the light source 21. The lens system 22 is depicted once again in FIG. 4 in a more effectively visible detail illustration. It may be seen herein that the light beam 30 is provided in a fashion running substantially parallel upon emanating from the light exit surface 29. However, the light beam 30 can also be a slightly divergent light beam, and in this case the aperture angle 31, illustrated in the upper right-hand part of FIG. 4, of such a slightly divergent light beam 30 is preferably provided to be less than approximately 20°, with particular preference less than approximately 15°, very particularly less than approximately 10° and specifically preferably less than approximately 5°. It is also possible to provide according to the invention that the light beam 30 is provided in a parallel fashion (aperture angle 0°) or convergent (aperture angle negative). The illumination means has, in turn, the lens system 22 with a lens 27 and a further lens 25. It could also be provided according to the invention (not shown) that only one lens 27 is present in the illumination means 20, or that the lens 27, and thus also the light exit surface 29, are integrated in the light-emitting diode or in the light-emitting diodes of the light source (not shown). Furthermore, FIG. 4 makes clear the spacing 15 between the light exit surface 29 and the rear side 13 of the display surface 12.

Figure 5:
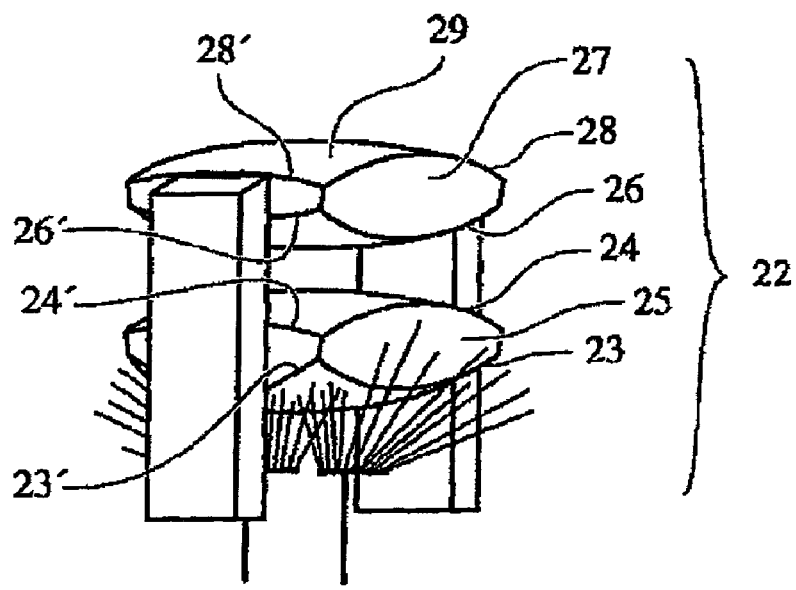
FIGS. 5 and 6 show an exemplary embodiment of a lens system for an inventive display device in a perspective illustration and in a sectional illustration, respectively.
Figure 6:
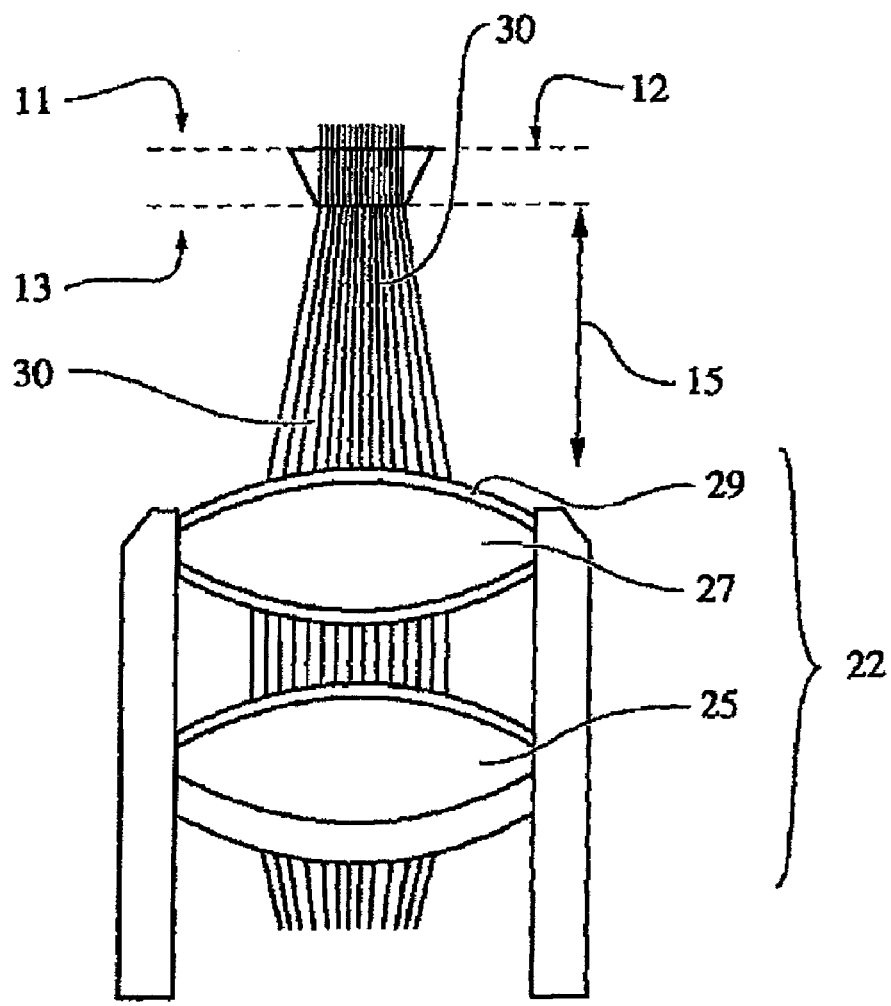

A perspective illustration is shown in FIG. 5, and an exemplary embodiment of the lens system 22 is represented in a sectional illustration in FIG. 6. Here, the lens 27 with its light exit surface 29, and the further lens 25 are respectively depicted. The light is emitted by the light source 21 (not depicted in FIGS. 5 and 6) in the upward direction and is focused into the light beam 30 by means of the lens system 22. It can be seen in this case from FIG. 5 that the lens 27 and the further lens 25 have different radii of curvature of their delimiting surfaces. These radii of curvature of the surfaces of the lens 27 or of the further lens 25 can change in different directions of the main planes of extent of the lenses 25, 27. By way of example, for this purpose in FIG. 5 the reference numeral 26 specifies the radius of curvature of the top side of the lens 27 in accordance with one spatial direction, and 28' specifies the radius of curvature of the top side of the lens 27 in a spatial direction perpendicular thereto. The top side of the lens 27 also corresponds here to the light exit surface 29. Correspondingly, the reference symbol 26 specifies the radius of curvature of the underside of the lens 27 in one of the spatial directions, and 26' specifies the radius of curvature of the underside of the lens 27 in the spatial direction perpendicular thereto. The reference numerals 24 and 24', respectively, denote the radii of curvature in different spatial directions of the top side of the further lens 25, and 23 and 23' respectively specify the radii of curvature in different spatial directions of the underside of the further lens 25. Such measures enable the shape of the cross section of the light beam 30 to be varied in a direction transverse to the propagation of the light beam 30, for example to fashion this cross section to be substantially rectangular, or substantially square, or substantially star-shaped, or substantially triangular, or substantially oval.

Furthermore, FIG. 6 indicates the display surface 12 together with the spacing 15 between the light exit surface 29 and the underside 13 of the display surface 12. It is particularly preferred in accordance with the present invention when the lens' system 22 or the lens 27 or the further lens 25 is implemented from a plastic material, in particular by means of an injection molding process or other shaping process that can be implemented cost effectively, so that it is possible to realize an efficient compromise between the optical quality of the lens arrangement 22 and the price or the production costs of the illumination means 22, and yet to realize a comparatively sharp light spot 35 on the front side of the display surface 12. Owing to the spacing 15, it is possible for there to be more space for other components such as, for example, light guiding elements or the like underneath the display surface 12. Owing to the good focusing of the light beam 30 with the aid either of a small aperture angle 31, or even of a convergent or substantially parallel shape of the light beam 30, it is possible according to the invention for a small fraction of scattered light to arrive in the case of the display on the display surface 12, and thus for there to be a substantially directed light beam in the interior. PMMA or PC (polycarbonate), for example, come into consideration as material for the lenses 25, 27 or for the lens system 22.

LIST OF REFERENCE NUMERALS

10 Display device
11 Visible side of the display surface
12 Display surface
13 Rear side of the display surface
14 Rotation axis
15 Spacing
16 Subsurface pointer 17 Pointer
20 Illumination means
21 Light source
22 Lens system
23,24,23',24',26,28,26',28' Radius of curvature of the lens and of the further lens, respectively
25 Further lens
27 Lens
29 Light exit surface
30 Light beam
31 Aperture angle
35 Light spot

The invention claimed is:

1. A display device for a motor vehicle, in particular for a combined instrument of a motor vehicle, comprising:
   a display surface, having a visible side and a rear side; and
   illumination means having a light exit surface and a light source, the illumination means being arranged on the rear side of the display surface,
   wherein the illumination means is configured to generate a light beam emanating from the light exit surface that falls directly onto the rear side of the display surface and has an aperture angle of less than approximately 20°,
   wherein the light beam emanating from the light exit surface is convergent or substantially parallel so as to produce a sharp illumination spot on the visible side of the display surface, and
   wherein the light exit surface is provided below the display surface in a fashion rotatable about a rotation axis substantially perpendicular to the display surface.

2. The display device as claimed in claim 1, wherein the aperture angle is less than approximately 15°.

3. The display device as claimed in claim 1, wherein the cross section of the light beam transverse to the propagation direction of the light is one of square, triangular, rectangular, star-shaped and oval.

4. The display device as claimed in claim 1, wherein the light exit surface is arranged at a spacing from the rear side of the display surface, the spacing being between approximately 1 millimeter and approximately 10 millimeters.

5. The display device as claimed in claim 1, wherein the illumination means has a lens, the lens having the light exit surface, and the light source being arranged on the side of the lens averted from the light exit surface.

6. The display device as claimed in claim 1, wherein the illumination means has a lens system with the lens and a further lens, the further lens being arranged between the lens and the light source.

7. The display device as claimed in claim 1, wherein the light source comprises at least one light-emitting diode.

8. The display device as claimed in claim 1, wherein the illumination means is arranged on a subsurface pointer.

9. The display device as claimed in claim 1, wherein the aperture angle is less than approximately 10°.

10. The display device as claimed in claim 1, wherein the aperture angle is less than approximately 5°.

11. The display device as claimed in claim 1, wherein the light exit surface is arranged at a spacing from the rear side of the display surface, the spacing being between approximately 2 millimeters and approximately 8 millimeters.

12. The display device as claimed in claim 1, wherein the light exit surface is arranged at a spacing from the rear side of the display surface, the spacing being between approximately 3 millimeters and approximately 6 millimeters.

13. A display device for a motor vehicle, in particular for a combined instrument of a motor vehicle, comprising:
   a display surface, having a visible side and a rear side; and
   an illumination device having a light exit surface and a light source, the illumination device being arranged on the rear side of the display surface,
   wherein the illumination device is configured to generate a light beam emanating from the light exit surface that falls directly onto the rear side of the display surface and has an aperture angle of less than approximately 20°,
   wherein the light beam emanating from the light exit surface is convergent or substantially parallel so as to produce a sharp illumination spot on the visible side of the display surface, and
   wherein the light exit surface is provided below the display surface in a fashion rotatable about a rotation axis substantially perpendicular to the display surface.

* * * * *